United States Patent [19]
Yun

[11] Patent Number: 5,346,754
[45] Date of Patent: Sep. 13, 1994

[54] FABRIC EQUIPMENT GUARD

[75] Inventor: Chong S. Yun, Gillette, Wyo.

[73] Assignee: Atlantic Richfield Company, Los Angeles, Calif.

[21] Appl. No.: 23,656

[22] Filed: Feb. 26, 1993

[51] Int. Cl.$^5$ .......................... B32B 5/6; B32B 27/00; E04C 1/00; E05D 15/16
[52] U.S. Cl. .................... 428/228; 428/233; 428/284; 428/286; 428/421; 52/309.6; 162/155; 160/84.1 E; 160/201
[58] Field of Search ............... 428/228, 233, 421, 285, 428/284, 286; 52/309.6; 162/155; 160/84.1 E, 201

[56] References Cited
U.S. PATENT DOCUMENTS

| | | | |
|---|---|---|---|
| 4,054,710 | 10/1977 | Botsolas | 428/285 |
| 4,054,711 | 10/1977 | Botsolas | 428/285 |
| 4,547,014 | 10/1985 | Wicker | 296/100 |

*Primary Examiner*—George F. Lesmes
*Assistant Examiner*—Kathryne E. Shelborne
*Attorney, Agent, or Firm*—Michael E. Martin

[57] ABSTRACT

A flexible fabric machinery guard is characterized by one or more lightweight panels of porous, plastic-coated, woven glass fibers which are reinforced by non-porous fabric borders. The panels each include elongated, tension-bearing cables extending through sleeves formed in the panel fabric. Opposed gudgeon and pintle connectors interconnect the panels with upstanding support members so that the panels may be removed to permit access to the machinery space. The machinery guard provides ventilation for the machinery space, visual inspection of the machine from outside the machinery space and easy access thereto by removing and folding the panels.

9 Claims, 2 Drawing Sheets

FABRIC EQUIPMENT GUARD

BACKGROUND OF THE INVENTION

1. Field of the Invention

The present invention pertains to an equipment or machinery guard which includes one or more panels of flexible fabric such as fluorocarbon resin coated fiberglass which is lightweight and may be more easily removed from its working position and stored when access to the machinery is required.

2. Background

Many types of machines require, by governmental regulation or by prudent judgment, guards or barriers to prevent accidental contact with the machine by personnel in the vicinity of the machine. Such guards typically are fabricated of expanded or perforated metal panels which may be secured together or to the machine or equipment to provide protection from contact with portions of the machine which may cause injury. Certain criteria for equipment guards must, of course, be met. The guard structure typically should be somewhat foraminous to permit ventilation in the vicinity of the machine or equipment and to permit visual observation of the condition of the machine. At the same time the guard must be structurally adequate to prevent personnel from accidentally falling on or through the guard and coming in contact with the machine. Certain other requirements must be met in certain machinery guard applications such as breaking strength, operating temperature range and resistance to combustion.

All of the above-mentioned requirements must be met by equipment guards which are sometimes required to be placed in confined spaces such as on-board portable mining equipment, transportation equipment and the like. In these types of applications the machinery to be guarded is sometimes located in a confined space and access to the machine and removal and temporary storage of the guard is difficult. The weight of the guard pieces is often such as to make it difficult for personnel to move the guard away from the machine and the confined space in which the machine is disposed makes it difficult or impossible to place the guard in an out-of-the-way position so that servicing or repair of the machine which is being guarded may be carried out. Meeting all of these criteria for equipment guards has been a vexing problem for workers in the art of equipment guard design and fabrication. However, in accordance with the present invention, the criteria and desiderata for equipment guards in many applications has been met with an improved equipment guard which will be described in further detail hereinbelow.

SUMMARY OF THE INVENTION

The present invention provides an improved equipment or machinery guard which is characterized by easily removable, lightweight and flexible panels or pieces which are of sufficient strength to perform the protective function of the guard while permitting easy access to the machine being guarded during servicing or repair of same.

In accordance with one aspect of the present invention, an improved machinery guard is provided which comprises one or more generally planar members which are secured to spaced apart supports and are characterized by flexible reinforced fabric panels which include relatively large foraminous portions to permit ventilation and visual observation of the machinery being guarded by the panels. The fabric panels are preferably formed of fiber reinforced plastic such as woven fiberglass coated with a fluorocarbon resin, for example.

In accordance with another important aspect of the present invention, a machinery guard is provided which is characterized by one or more panels which are formed of flexible, lightweight fabric and wherein the panels include support members which are connected to spaced apart stanchions or the like and may be easily disconnected from the stanchions, folded and stored when access to the machine being guarded is required. The flexible panels are each provided with one or more flexible reinforcing members which permit tensioning of the panels to provide a substantially rigid wall when the guard is in place and wherein the reinforcing members bear a substantial portion of the tensioning forces exerted on the panels when in their working position.

In accordance with yet a further aspect of the present invention, a machinery guard is provided which has one or more removable, flexible, lightweight guard panels which are secured to spaced apart support members by unique connecting and supporting mechanism.

The machinery guard of the present invention enjoys several advantages for certain applications of machinery guards. The guard panels are lightweight and easily moved by operating personnel. The guard panels are also flexible and may be folded and set aside when access to the machine being guarded is required while requiring little space for removal and storage. The guard panels are reinforced with members which may absorb accidental or unwanted forces which might be exerted on the panels. The machinery guard panels are made of a unique non-metallic fabric which meets operating temperature and strength requirements in many machinery guard applications.

Those skilled in the art will recognize the above-described advantages and features of the present invention together with other superior aspects thereof upon reading the detailed description which follows in conjunction with the drawing.

DESCRIPTION OF A PREFERRED EMBODIMENT

Figure 1:
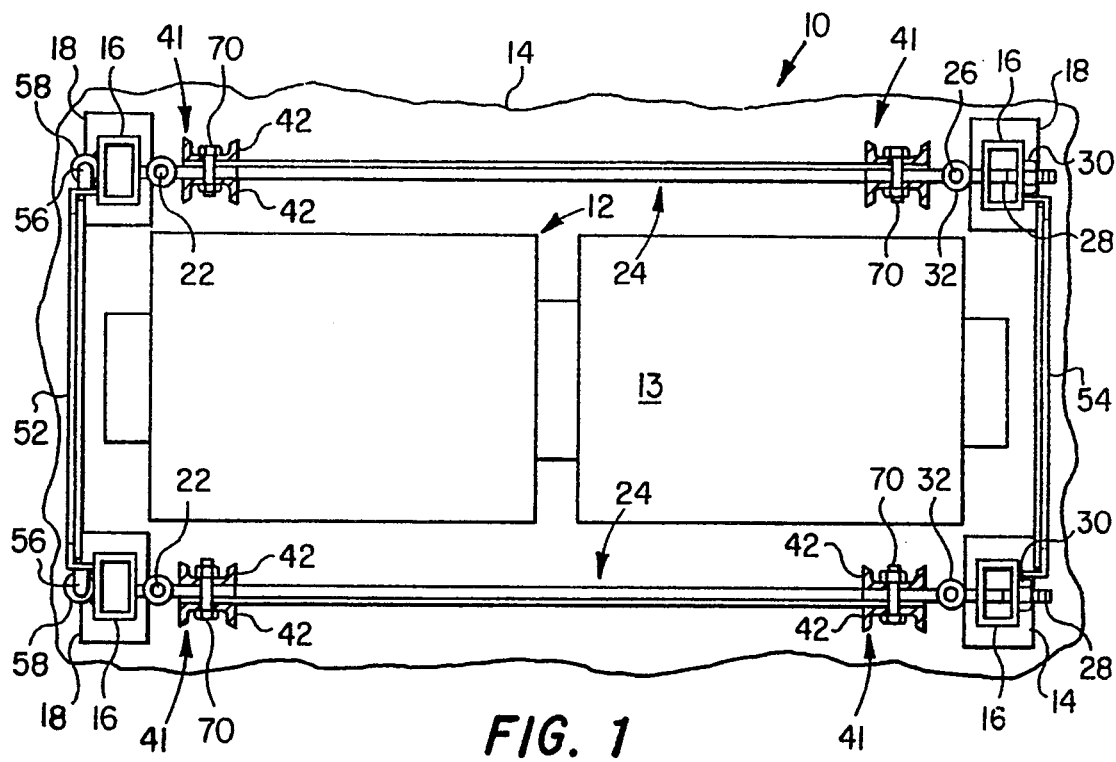
FIG. 1 is a plan view of one embodiment of the equipment/machinery guard of the present invention.

In the description which follows, like parts are marked throughout the specification and drawing with the same reference numerals, respectively. The drawing figures are not necessarily to scale in the interest of clarity and conciseness.

Figure 2:
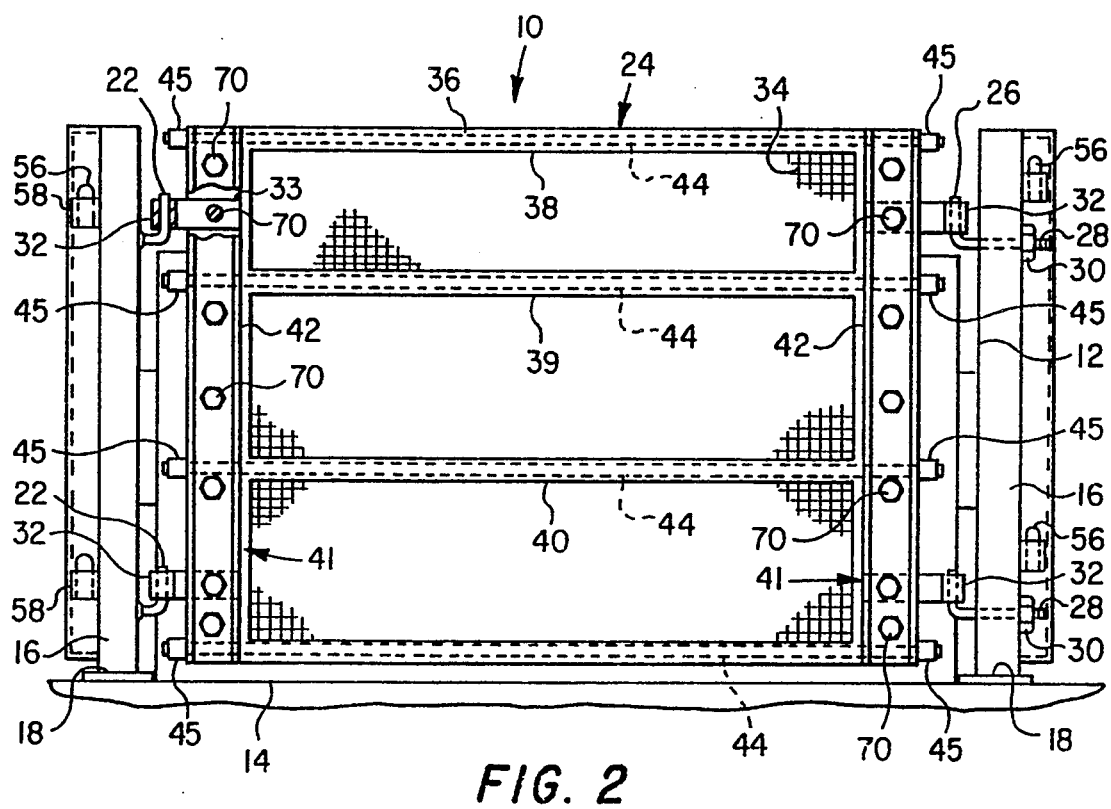
FIG. 2 is a side elevation of the guard illustrated in FIG. 1.

Referring to FIGS. 1 and 2 there is illustrated a unique equipment or machinery guard, generally designated by the numeral 10, which is disposed around a machine 12 and defines an enclosure or space 13. The machine 12 may, for example, be an electric motor-generator set which is mounted on a suitable base or floor 14. The motor-generator set 12 may, for example, be disposed in the machinery house of a mobile piece of equipment such as a large excavator, dragline or blasthole drill rig or other piece of equipment which has machinery on board and disposed in confined spaces.

The improved machinery guard of the present invention is not required to be used only for such applications although its advantages are particularly realized in applications where the piece of equipment or machine being guarded is disposed in a confined space.

The machinery guard 10 is characterized by four spaced apart upstanding steel or aluminum support columns or stanchions 16 which have base parts 18 suitably secured to the base or floor 14. The support columns or stanchions 16 may comprise generally rectangular cross-section steel tubes or the like, as illustrated. At least two of the column members 16 each have two vertically spaced apart pintles or support pins 22 suitably secured thereto and adapted to be connected to opposed panels 24 of the machinery guard 10 and which are of unique construction. The opposite column members 16 on the other side of the panels 24 are also provided with spaced apart upstanding pintle members 26 which have shank portions 28 extending transversely through the column members 16. The pintle shanks 28 include threaded end portions which are threadedly engaged with conventional hex nuts 30. The pintles 22 and 26 are connected to cooperating gudgeon members 32 which are sleeved over each of the pintle members as shown in FIGS. 1 and 2. The gudgeon members 32 are suitably secured to the opposed guard panels 24 in a manner which will be described in further detail herein.

A major portion of each of the machinery guard panels 24 is formed of a flexible, lightweight high-strength fabric sheet 34 which is foraminous and has generally rectangular openings between its threads of approximately 0.25 inches along the warp and weft, respectively. In this way suitable ventilation of the space enclosed by the guard 10 may be accomplished and operating or maintenance personnel standing outside of the enclosure defined by the guard 10 may observe the machine 12. The flexible fabric sheets 34 are reinforced by additional fabric sheets, generally designated by the numeral 36, which form borders around the sheets 34 and leave one or more relatively large window openings 38, 39 and 40, for example, which are occupied only by the fabric sheet 34. The panels 24 also include opposed substantially rigid end parts 41 which are built up of plural components which will be described in further detail herein. Each of the panels 24 is also reinforced by plural tension-bearing members 44 which withstand the tension forces exerted on the panels when they are secured to the stanchions 16 and also provide additional strength for the panels to prevent incursion through the panels into the space 13 occupied by the machine 12.

The exemplary guard 10 has opposed end panels 52 and 54 which may be formed of conventional expanded metal parts with a metal channel or angle shaped perimeter, for example, the panels 52 and 54 each have opposed spaced apart pintle members 56 secured to their perimeters and adapted to be received in spaced apart sockets or gudgeons 58 secured on the column member 16. In this way, the panels 52 and 54 may be lifted up slightly to remove the pintles 56 from the sockets 58 and set aside to gain access to the opposed ends of the machine 12. In the exemplary guard 10 the distance between opposed longitudinal sides of the machine 12 are not substantial and the weight and size of the end panels 52 and 54 permit these panels to be made of a substantially rigid material such as conventional expanded metal partitions. Those skilled in the art will recognize that the end panels 52 and 54 may, of course, be formed in a manner similar to that of the panels 24.

Figure 3:
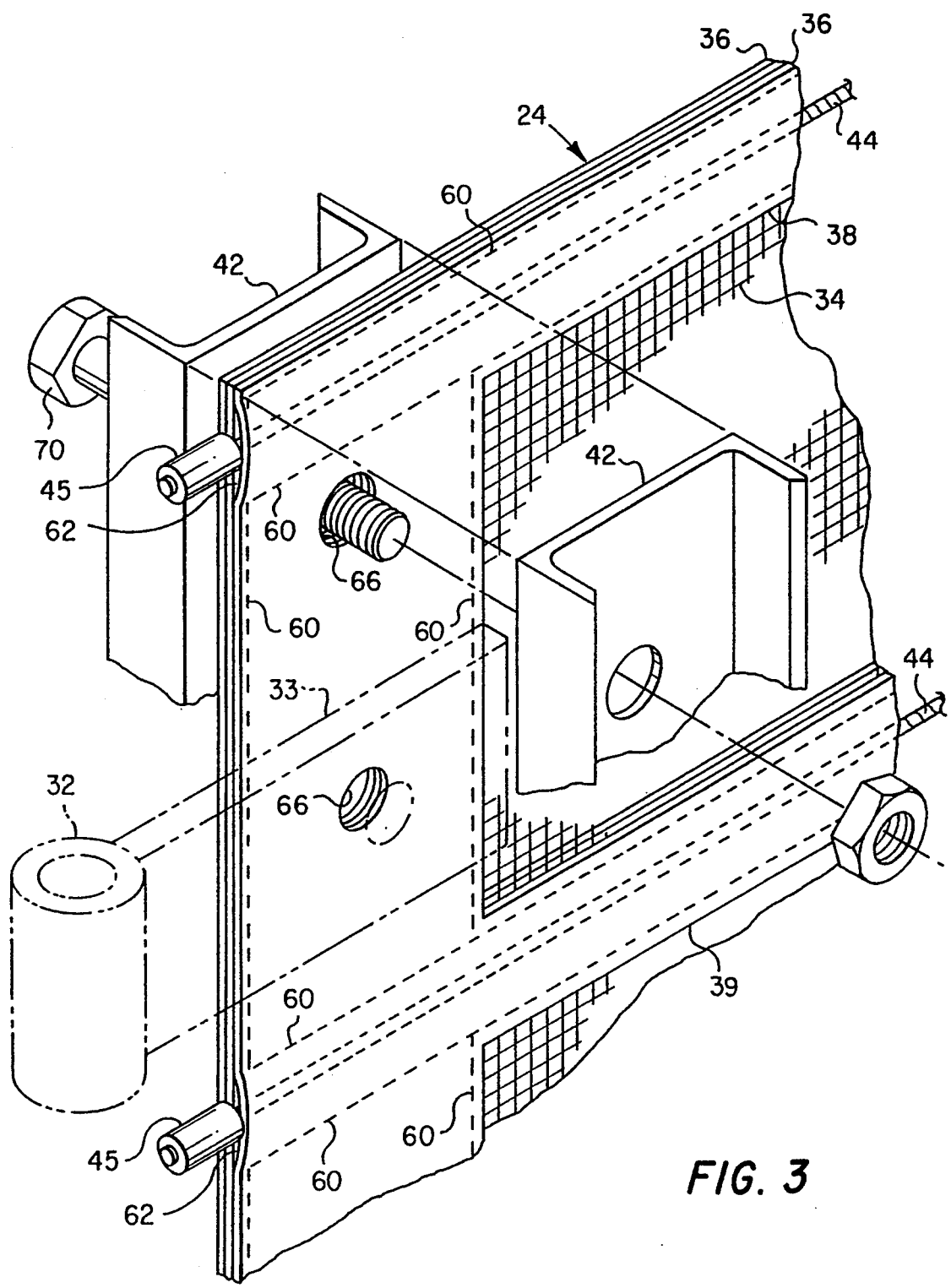
FIG. 3 is a detail perspective view of a portion of one of the fabric panels and associated support parts.

Referring now also to FIG. 3, there is illustrated a portion of one of the panels 24 including certain structural features. Each of the panels 24 is made up of a sheet of reinforced fabric 34 which is sandwiched between opposed sheets of fabric 36, as illustrated. The sheets 36 are cut to form the windows 38, 39 and 40 and are secured to each other and to the sheet 34 by suitable thread stitching 60 around the perimeter of the windows 38, 39 and 40, around the perimeter of the panels 24, and along and defining plural spaced apart sleeve portions 62, two shown in FIG. 3, through which the flexible reinforcing and tension-bearing members 44 extend, as illustrated. The stitching 60 may be replaced by chemical or thermal adhesion means, not illustrated, for securing the sheet pieces of fabric 34 and 36 together in the sandwich construction illustrated.

Each panel 24 is also provided with plural spaced apart grommets 66, two illustrated in FIG. 3, which provide openings for fastener means for securing substantially rigid panel end members 42 to the fabric panels 34 and 36 as illustrated in all of the drawing figures. The opposed transverse ends of the panels 24 are provided with back-to-back substantially rigid end members 42 comprising lightweight metal channel shaped parts which are secured together and to the panel 24 by suitable threaded fasteners 70.

As shown in FIGS. 2 and 3, each gudgeon 32 has a rectangular plate shank portion 33 which is also suitably secured by one of the fasteners 70 between the rigid end members 42, see example in FIG. 2, which is partially sectioned in the upper left corner to illustrate the connection between a pintle 22 and the gudgeon 32 and between the gudgeon shank 33 and the panel 24.

Referring further to FIGS. 2 and 3, the tension-bearing members 44 are preferably characterized by plastic-coated, high-strength, flexible wire rope or cable of a type such as used in aircraft construction and control elements. Cables having a working load capability of 2000 lbs. in tension may be suitable. The cable members 44 are each provided with tubular beckets 45 secured to each end of the cable by crimping or other conventional means. When the panels 24 are assembled with the channel members 42 clamped on opposite sides of each end of a panel, the tension-bearing members 44 are also clamped by and between the channel members. The ends of the beckets 45 adjacent the end parts 41 abut the side edges of the channel members 42 but are not clamped therebetween. Accordingly, when the panels 24 are tensioned upon assembly to the column member 16 by tightening the nuts 30 to draw the shanks of the pintles 26 to the right, viewing FIG. 2, the tension-bearing members 44 absorb a substantial amount of the tension forces exerted on the panels to prevent tearing of the fabric members 34 and 36 while permitting these members to be suitably stretched or tensioned to provide a substantially planar wall or partition.

Preferred materials for forming the panels 24 comprise that which is mentioned hereinbefore. In particular, the panel sheets or members 34 may be formed of woven fiberglass coated with a fluorocarbon resin. One type of material which is suitable is manufactured by Allied Signal, Inc. under the trade name Fluorglas and comprises fiberglass cloth with a fluorocarbon resin or Teflon plastic coating. For example, the members 34 may be formed of porous Teflon/glass fabric with 0.25 inch windows or spaces between the fabric threads. A material designated by Allied Signal part number 384-30/1 has been found to be suitable. This material has a nominal thickness of 0.030 inches and a breaking strength of 200 pounds per inch of width.

The outer layers or sheets of fabric 36 may also be formed of a tear-resistant fluorocarbon resin coated fiberglass fabric also available under the trademark Fluorglas from Allied Signals Inc. as their part number 368-10. The nominal thickness of the parts 36 is 0.010 inches with a breaking strength of 225 pounds per inch of width. The channel members 42 may be formed of aluminum or other suitable substantially rigid material.

Thanks to the construction of the machinery guard panels 24, these panels may be easily removed when it is desired to have access to the machine 12 by merely loosening the pintles 26 until the gudgeons 32 may be slipped off of the pintles 22 and 26. The panels 24 may then be folded or rolled and set aside. Thanks to their light weight, the panels 24 may be easily handled by one or more operating personnel, depending on panel length and height, and by folding or rolling the panels, they may be easily stored in confined spaces. When the panels 24 are reassembled to the machinery guard 10, the opposed gudgeons 32 on each end of the panels are slipped over the pintles 22 and 26 and the nuts 30 are tightened until suitable tension is exerted on the panels to cause them to be substantially rigid. Thanks to the tension-bearing cable members 44, the panels may be tightened substantially to form a substantially rigid wall without tearing the fabric parts 34 and 36. Although the fluorocarbon resin coated fiberglass fabric forms a suitable panel material, other fabrics such as those of the Kevlar brand may be suitable also.

Those skilled in the art will appreciate from the above-described features and characteristics of the machinery guard 10 that a unique device has been developed in accordance with the present invention. Although a preferred embodiment has been described herein, those skilled in the art will recognize that various substitutions and modifications may be made to the machinery guard 10 without departing from the scope and spirit of the invention as recited in the appended claims.

What is claimed is:

1. A machinery guard comprising:
   at least one elongated generally planar panel member forming a barrier to a machinery space and spaced apart support members for said panel member;
   connectors between each of said support members and said panel member for supporting said panel member to prevent incursion into said machinery space;
   said panel member has opposed, substantially rigid end members for securing said panel member to said connectors and said panel member being formed of a sheet of reinforced flexible foraminous fabric and said fabric is sandwiched between reinforcing sheets having plural windows formed therein for exposure of said foraminous fabric and said panel member being removable from said support members and being foldable to provide access to said machinery space.

2. The machinery guard set forth in claim 1 wherein: said rigid end members comprise pairs of opposed, substantially rigid members which are secured to each other and to said panel member by plural fasteners.

3. The machinery guard set forth in claim 1 wherein: said panel member includes plural tension-bearing members for bearing tension forces exerted on said panel when connected to said support members.

4. The machinery guard set forth in claim 3 wherein: said tension-bearing members comprise flexible cable members extending between opposite ends of said panel member.

5. The machinery guard set forth in claim 3 wherein: said panel member has plural spaced apart longitudinal sleeves formed therein for receiving said tension-bearing members.

6. The machinery guard set forth in claim 1 wherein: said connectors comprise at least one pintle and gudgeon assembly wherein said pintle and gudgeon are secured to one of said support member and said panel member, respectively.

7. The machinery guard set forth in claim 6 wherein: said pintle is secured to said support member and includes a threaded shank portion for adjusting the position of said pintle and for tensioning said panel member when supported on and connected to said support members, respectively.

8. A machinery guard for enclosing a machine within a confined space comprising:
   spaced apart column members disposed to define a machinery space within an area bounded by said column members, collectively;
   opposed flexible panel members extending between respective pairs of said column members, said panel members each including connectors secured to opposite ends thereof for connection to cooperating connectors on said column members, respectively;
   each of said panel members comprising a sheet of foraminous fabric and flexible cable tension-bearing members extending between opposite ends of said panel members and operable to sustain tension forces exerted on said panel members when connected to said support members, respectively.

9. A machinery guard for enclosing a machine within a space comprising:
   spaced apart support members disposed to define a machinery space within an area bounded by said support members, collectively;
   opposed flexible panel members extending between said support members, each of said panel members including connectors secured to opposite ends thereof for connection to cooperating connectors on said support members, respectively;
   each of said panel members comprising a sheet of foraminous fabric of woven glass fibers coated with a fluorocarbon resin, opposed sheets of fluorocarbon resin coated fabric secured to said sheet of foraminous fabric such that said sheet of foraminous fabric is disposed between said sheets of resin coated fabric and at least one window in said sheets of resin coated fabric, respectively, for exposure of said sheet of foraminous fabric, and plural elongated sleeves formed in said panel members; and
   plural flexible cable tension-bearing members extending within said sleeves between opposite ends of each of said panel members and operable to sustain tension forces exerted on said panel members when connected to said support members, respectively.

* * * * *